United States Patent
Lin et al.

(10) Patent No.: US 11,834,197 B2
(45) Date of Patent: Dec. 5, 2023

(54) UNMANNED AERIAL VEHICLE LANDING GEAR CONTROL METHOD, APPARATUS, UNMANNED AERIAL VEHICLE, AND SYSTEM THEREOF

(71) Applicant: SZ DJI TECHNOLOGY CO., LTD., Shenzhen (CN)

(72) Inventors: Canlong Lin, Shenzhen (CN); Li Wang, Shenzhen (CN); Zhimeng Shang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 510 days.

(21) Appl. No.: 16/515,428

(22) Filed: Jul. 18, 2019

(65) Prior Publication Data

US 2019/0337637 A1 Nov. 7, 2019

Related U.S. Application Data

(63) Continuation of application No. PCT/CN2017/071711, filed on Jan. 19, 2017.

(51) Int. Cl.
*B64D 45/04* (2006.01)
*B64C 25/24* (2006.01)
*G01C 5/00* (2006.01)
*G05D 1/06* (2006.01)
*B64U 70/00* (2023.01)

(52) U.S. Cl.
CPC ............. *B64D 45/04* (2013.01); *B64C 25/24* (2013.01); *G01C 5/005* (2013.01); *G05D 1/0676* (2013.01); *B64U 70/00* (2023.01)

(58) Field of Classification Search
CPC ..... B64D 45/04; B64C 25/24; B64C 2201/18; G01C 5/005; G05D 1/0676
See application file for complete search history.

(56) References Cited

U.S. PATENT DOCUMENTS 5,745,053 A 4/1998 Fleming, III
2016/0371985 A1* 12/2016 Kotecha .............. G06Q 10/047

FOREIGN PATENT DOCUMENTS

| CN | 103204239 A | | 7/2013 | |
|----|-------------|---|--------|---|
| CN | 104843192 A | | 8/2015 | |
| CN | 105259917 A | * | 1/2016 | |
| CN | 106054903 A | * | 10/2016 | ........... G05D 1/0676 |
| CN | 205633022 U | | 10/2016 | |

(Continued)

OTHER PUBLICATIONS

World Intellectual Property Organization (WIPO) International Search Report for PCT/CN2017/071711 dated Mar. 29, 2017 5 pages.

*Primary Examiner* — Vivek D Koppikar
*Assistant Examiner* — Jeffrey R Chalhoub
(74) *Attorney, Agent, or Firm* — ANOVA LAW GROUP, PLLC (57) ABSTRACT

A method for controlling a landing gear of an unmanned aerial vehicle (UAV) includes detecting whether a relative-to-ground height of the UAV is greater than a height threshold, where the relative-to-ground height is a vertical height of the UAV with respect to an object; and in response to the relative-to-ground height being not greater than the height threshold and the UAV having not lowered the landing gear, adjusting the relative-to-ground height to the height threshold or above, and lowering the landing gear.

16 Claims, 6 Drawing Sheets

(56) References Cited

FOREIGN PATENT DOCUMENTS

| | | | | |
|---|---|---|---|---|
| CN | 106103274 A | 11/2016 | | |
| CN | 107000832 A | 8/2017 | | |
| GB | 2483881 A | * 3/2012 | ............. | B64C 25/10 |

* cited by examiner

UNMANNED AERIAL VEHICLE LANDING GEAR CONTROL METHOD, APPARATUS, UNMANNED AERIAL VEHICLE, AND SYSTEM THEREOF

CROSS-REFERENCE TO RELATED APPLICATION

This application is a continuation application of International Application No. PCT/CN2017/071711, filed on Jan. 19, 2017, the entire contents of which are incorporated herein by reference.

TECHNICAL FIELD

The present disclosure relates to the field of aerial vehicle and, more particularly, to unmanned aerial vehicle landing gear control method and apparatus, a user device, an unmanned aerial vehicle, and an unmanned aerial vehicle system thereof.

BACKGROUND

Unmanned aerial vehicles (UAVs) have a relatively low cost, a flexible motion, and good operability, have no risk of human casualties, and are suitable for use in relatively hostile environments. UAVs have applications in various fields, e.g., low-altitude reconnaissance, meteorological surveys, aerial photography, etc.

A UAV with a landing gear transformation function is usually controlled manually by a user through a remote control to lower the landing gear. However, the UAV may not timely release the landing gear, and may further cause the UAV fuselage to directly touch a ground or another obstacle, resulting in damage to the UAV.

SUMMARY

In accordance with the disclosure, there is provided a method for controlling a landing gear of an unmanned aerial vehicle (UAV). The method includes detecting whether a relative-to-ground height of the UAV is greater than a height threshold, where the relative-to-ground height is a vertical height of the UAV with respect to an object; and in response to the relative-to-ground height being not greater than the height threshold and the UAV having not lowered the landing gear, adjusting the relative-to-ground height to the height threshold or above, and lowering the landing gear.

Also in accordance with the disclosure, there is provided a user device including a processor and a memory storing instructions. The instructions, when executed by the processor, cause the user device to detect whether a relative-to-ground height of an unmanned aerial vehicle (UAV) is greater than a height threshold, where the relative-to-ground height is a vertical height of the UAV with respect to an object; and in response to the relative-to-ground height being not greater than the height threshold and the UAV having not lowered a landing gear, to adjust the relative-to-ground height to the height threshold or above, and lower the landing gear.

Also in accordance with the disclosure, there is provided an unmanned aerial vehicle (UAV). The UAV includes a fuselage, a landing gear, a sensing element, and a controller arranged at the fuselage. The landing gear is connected to the fuselage. The sensing element is arranged at the fuselage and configured to sense a relative-to-ground height of the UAV. The controller is configured to detect whether the relative-to-ground height of the UAV is greater than a height threshold, where the relative-to-ground height is a vertical height of the UAV with respect to an object; and in response to the relative-to-ground height being not greater than the height threshold and the UAV having not lowered the landing gear, adjust the relative-to-ground height to the height threshold or above, and lower the landing gear.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

The terms "first," "second," "third," "fourth," and similar expressions used herein (if present) are used to distinguish similar objects without the necessity of describing a specific order or sequence. It is to be understood that the data so used may be interchanged where appropriate, so that the embodiments described herein can be implemented in sequences other than what is illustrated or described herein.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed. In addition, terms "include", "have" and similar expressions are intended to cover non-exclusive inclusions. For example, processes, methods, systems, products or devices containing a series of steps or units are not limited to those clearly shown steps or units, and can include other steps or units not clearly shown, or other inherent steps or units of these processes, methods, products or devices.

A UAV may be installed with a landing gear for supporting a UAV fuselage, such that the UAV can stand upright with its landing gear when landing. To prevent the landing gear fixed to the fuselage from disturbing an operation of the UVA due to not being able to retract and release the landing gear, conventional UAVs may have a landing gear transformation function. However, certain factors may cause the UAV not to timely lower the landing gear, resulting in some consequences. For example, when a user tests a UAV with a landing gear transformation function, the user may forget to turn on a switch for the landing gear in time during the landing of the UAV due to misoperation or the like, causing the UAV fuselage to directly touch the ground and crash. As another example, in some flight environment with abrupt terrain changes, the UAV may suddenly fly to a region with a high terrain from a region with an open space below. If the user is not familiar with the topography and is not able to adjust a throttle rocker in time, the UAV may be caused to directly touch the ground before the landing gear is lowered, and may crash. Thus, there is a need to control the landing gear with a transformation function in the UAV.

The present disclosure provides a method, an apparatus, and a user device for controlling a UAV landing gear, such that the landing gear can be automatically released when a UAV lands. The present disclosure may suppress a crash of a UAV caused by a landing gear not being released during landing of the UAV and a UAV fuselage directly touching the ground.

A UAV consistent with the disclosure may include a fuselage and a landing gear attached to the fuselage. The landing gear may be an accessory apparatus at a lower portion of the UAV, used to support the UAV during take-off or landing or taxiing on a ground surface/a water surface, and used for the UAV to move on the ground surface/the water surface. As an only component that supports the entire UAV, the landing gear may facilitate safe take-off and landing processes of the UAV.

In conventional technologies, by using a UAV remote controller, a user can perform corresponding flight control on the UAV, and can release and retract a UAV landing gear to provide safety protection to the UAV upon landing. However, during an actual flight of the UAV, abrupt changes in terrains, a misoperation of the user, or the like, may cause the UAV to directly collide with the ground without the UAV landing gear being lowered. As such, the UAV may crash, resulting in a damage to the UAV. The user may suffer economic losses, and flight costs may be increased.

In the embodiments of the present disclosure, by detecting a relative-to-ground (RTG) height of the UAV, i.e., a height of the UAV with respect to the ground, the landing gear can be automatically released when the UAV is below a safe flight height, to prevent a direct collision between the UAV and the ground due to a misoperation or the like. Accordingly, a probability of a UAV crash may be reduced, a destruction degree of the UAV may be reduced, an operation experience of a UAV user may be improved.

A UAV usually includes a fuselage, a landing gear connected to the fuselage, a controller provided at the fuselage, and a sensing element provided at the fuselage. The landing gear may be an accessory apparatus of the UAV and can be a portion of the UAV. In some embodiments, the descriptions that a UAV is in a direct collision with an object refers to that the fuselage of the UAV is in a direct collision with the object. The fuselage can include a gimbal of the UAV, a camera, and/or other apparatuses. The direct contact between the landing gear and the object may not be considered as a direct collision between the UAV and the object.

Figure 1:
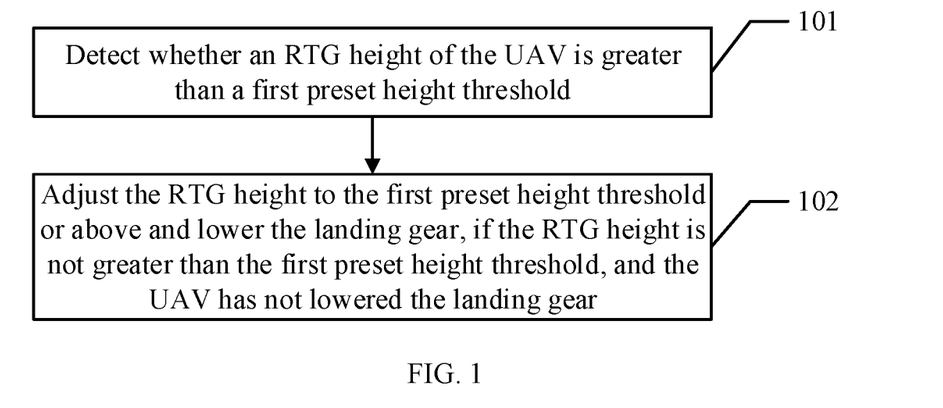
FIG. 1 illustrates a flow chart of an exemplary method for controlling an unmanned aerial vehicle (UAV) landing gear according to various disclosed embodiments of the present disclosure.

FIG. 1 illustrates a flow chart of an exemplary method for controlling a UAV landing gear according to various disclosed embodiments of the present disclosure. With reference to FIG. 1, the method is described below.

At 101, it is detected whether an RTG height of the UAV is greater than a first preset height threshold.

In some embodiments, in a flight of the UAV, the RTG height of the UAV can be obtained in real time through one or more sensing elements at the UAV, such as an ultrasonic wave sensor, a camera, an infrared sensor, etc. Further, it can be detected in real time whether the RTG height of the UAV is greater than the first preset height threshold. The RTG height may be a vertical height of the UAV relative to an object.

In some embodiments, the first preset height threshold may be set in advance as a safe flight height. Further, the safe flight height may be considered as a demarcation criterion for determining whether the UAV needs to automatically lower the landing gear. The first preset height threshold may be set based on data statistics, an operational experience of a UAV user, or the like, which is not restricted in the present disclosure.

In some embodiments, the object may include an obstacle, such as a building or a cardboard box on a ground, or may be the ground. The object can be any object that can form a vertical height difference with the UAV, which is not restricted in the present disclosure.

At 102, if the RTG height is not greater than the first preset height threshold, and the UAV has not lowered the landing gear, the RTG height is adjusted to the first preset height threshold or above, and the landing gear is lowered.

In some embodiments, if the RTG height of the UAV is detected to be not greater than the first preset height threshold and the UAV has not released the landing gear, the RTG height may be adjusted to the first preset height threshold or above, and the landing gear may be released.

In some embodiments, due to a misoperation of the UAV user, an abrupt change of a terrain, or the like, the RTG height of the UAV may be not greater than the first preset height threshold. Correspondingly, to ensure a safety of the UAV and prevent a direct collision between the UAV and the object, when the UAV has not lowered the landing gear, a vertical height between the UAV and the object may be adjusted to cause the RTG height to be greater than the first preset height threshold or to be at the first preset height threshold. That is, the UAV can be provided with a low-height limiting function. The low-height limiting function refers to that, when the UAV landing gear has not been released, the UAV may need to fly at an RTG height that is at the first preset height threshold or above. Turning on or turning off the low-height limiting function may be associated with the landing gear of the UAV. If the landing gear is retracted, the UAV may automatically turn on the low-height limiting function. If the landing gear is lowered, the UAV may automatically turn off the low-height limiting function. In some embodiments, turning off the low-height limiting function may be non-automatic. Whether turning off the low-height limiting function is automatic or not is not restricted, and may be selected according to various application scenarios, under the condition that the low-height limiting function is turned on when the landing gear is at a restricted status.

For example, the first preset height threshold can be approximately 0.7 m. Correspondingly, the height of the UAV relative to the object may need to be greater than approximately 0.7 m. Correspondingly, when the landing gear is at a retracted status, the low-height limiting function may be turned on, and the RTG height of the UAV relative to the object may need to be at least approximately 0.7 m. If it is detected that the RTG height of the UAV is lower than or equal to approximately 0.7 m due to an abrupt change in the terrain or the like, e.g., that the RTG height suddenly changes from approximately 1.2 m to approximately 0.3 m, the UAV can automatically and slowly increase the RTG height to approximately 0.7 m or above to prevent an accidental touch between the fuselage and the object, e.g., the ground. Further, after the RTG height of the UAV is adjusted to approximately 0.7 m or above, the landing gear can be lowered to reduce a probability of a direct collision of the fuselage in an event such as a descent of the UAV or an abrupt change in the terrain. In the present disclosure, the first preset height threshold may be one of one or more numerical values described above, but not limited thereto. The one or more numerical values described above are merely examples and are not intended to limit the present disclosure. The first preset height threshold may be selected from other numerical values, and is not restricted in the present disclosure.

If the detected RTG height of the UAV is larger than the first preset height threshold, it is indicated that the UAV is in relatively safe flight status. Thus, the flow may be ended without other operations, but the RTG height of the UAV may still be monitored in real time, to prevent a situation that the RTG height of the UAV does not satisfy the safe height and the landing gear is not released, which is not restricted in the present disclosure.

In some embodiments, before the RTG height of the UAV is detected, sensing data may be obtained in real time. The obtained sensing data can be used to calculate and thus obtain the RTG height of the UAV. As such, a relatively accurate detection result may be obtained during the detection of the RTG height. The process is described below in detail.

Figure 2:
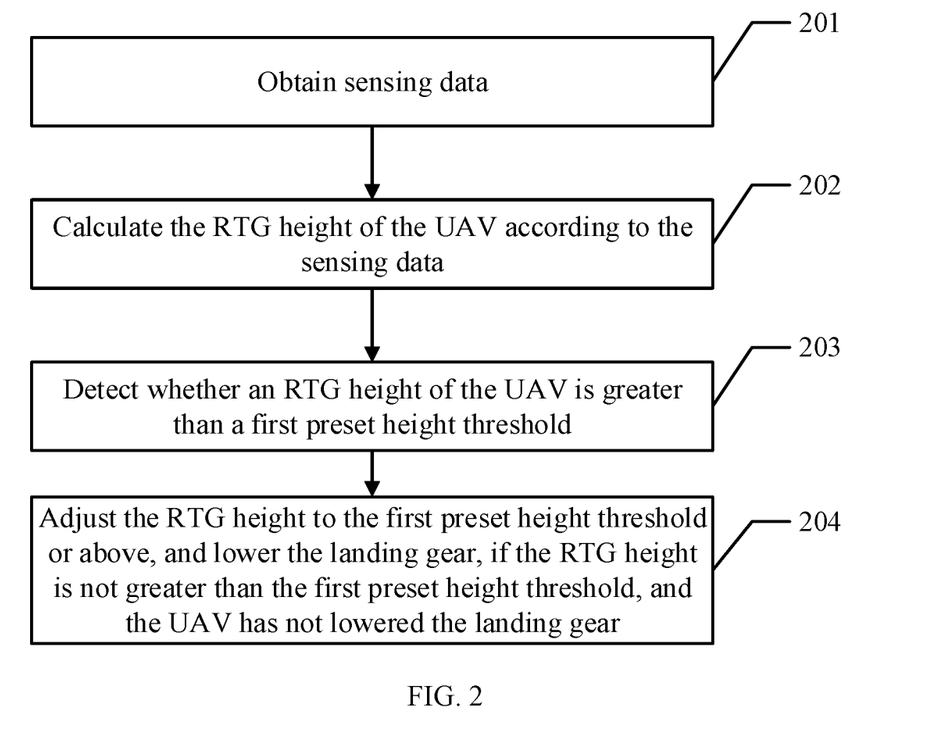
FIG. 2 illustrates a flow chart of another exemplary method for controlling a UAV landing gear according to various disclosed embodiments of the present disclosure.

FIG. 2 illustrates a flow chart of another exemplary method for controlling a UAV landing gear according to various disclosed embodiments of the present disclosure.

At 201, sensing data is obtained.

In some embodiments, during a UAV flight, the sensing data of the UAV can be obtained in real time through a sensing element, and a vertical height of the UAV relative to the object can be calculated in real time.

In some embodiments, obtaining the sensing data may include obtaining a first time difference between the UAV emitting an ultrasonic wave signal and receiving a reflected signal of the ultrasonic wave signal; or obtaining an image distance of a camera of the UAV when the camera focuses on the object; or obtaining a second time difference between the UAV emitting a radar wave signal, e.g., an electromagnetic wave signal, and receiving a reflected signal of the radar wave signal.

In addition, a time-of-flight (TOF) sensor, or another close-range sensor may be also used for short-range distance measurement, such as a laser radar, an infrared sensor, or the like, which uses the TOF of a light pulse for distance measurement.

In some embodiments, the sensing data may include one of the first time difference, the image distance, or the second time difference. In some embodiments, the bottom of the UAV may be provided with an ultrasonic wave unit. The ultrasonic unit may face towards the object and may be arranged facing downwards. The ultrasonic wave unit may include an ultrasonic wave transmitter and an ultrasonic wave receiver. After the ultrasonic wave transmitter is controlled to emit an ultrasonic wave signal, the ultrasonic wave receiver may be used to receive a reflected signal of the ultrasonic wave signal. According to an emitting time of the ultrasonic wave transmitter and a receiving time of the ultrasonic wave receiver, the first time difference between emitting the ultrasonic wave signal and receiving the reflected signal of the ultrasonic wave signal can be determined. In some embodiments, the bottom of the UAV may be provided with a camera. The camera may include a monocular or binocular camera. The cameral may face towards the object and may be arranged facing downwards. By using the camera to determine the object's focus position, an image distance of the camera at the time may be determined. In some embodiments, the bottom of the UAV may be provided with a radar device. The radar device may face towards the object and may be arranged facing downwards. The radar device may include a radar wave transmitter and a radar wave receiver. After the radar wave transmitter is controlled to emit a radar wave signal, the radar wave receiver may be used to receive a reflected signal of the radar wave signal. According to an emitting time of the radar wave transmitter and a receiving time of the radar wave receiver, the second time difference between emitting the radar wave signal and receiving a reflected signal of the radar wave signal can be determined.

The above-described examples are merely for illustrating manners of obtaining the sensing data and forms of the sensing data, and are not intended to limit the scope of the present disclosure. In various application scenarios, other manners may be selected to obtain the sensing data, as long as the RTG height of the UAV can be calculated according to the sensing data, which are not restricted in the present disclosure.

At 202, the RTG height of the UAV is calculated according to the sensing data.

In some embodiments, after the sensing data is obtained, the RTG height of the UAV may be calculated according to the sensing data.

In some embodiments, with different sensing elements as described above at process 201, different approaches of calculating the RTG height of the UAV may be adopted, as described below.

In Approach 1, the RTG height of the UAV is calculated according to the first time difference and a transmission speed of the ultrasonic wave signal.

In some embodiments, after the first time difference is obtained according to the emitting time of the ultrasonic wave transmitter and the receiving time of the ultrasonic wave receiver, given that a transmission speed of the ultrasonic wave signal in air is known, the RTG height of the UAV can be calculated according to the first time difference and the transmission speed of the ultrasonic wave signal.

In Approach 2, the RTG height of the UAV is calculated according to a correspondence between the image distance and an object distance.

In some embodiments, the camera is a monocular camera. The UAV may store a correspondence between image distances and object distances of the camera. After the camera focuses on the object and the image distance is obtained, the object distance corresponding to the image distance may be determined according to the stored correspondence. The determined object distance may be the distance between the camera and the object, e.g., the height of the camera relative to the object. Thus, the RTG height of the UAV can be calculated according to a positional relationship between the camera and the UAV and the height of the camera.

In some embodiments, the distance between the camera and the object is the distance between a center point of the camera and a focused position at the object. Regardless which position at the object is selected during focusing, a relatively accurate distance between the camera and the focused position at the object can be obtained.

In some embodiments, in addition to using a camera according to the above-described approach to calculate the RTG height of the UAV, other approaches may be used. For example, a camera may be used to capture images and the captured images may be used to calculate the RTG height of the UAV. For example, the camera may be a binocular camera. A first image may be obtained at a first position of the camera, and a first angle between the object and a perpendicular line passing through a visual field center of the first image can be determined. Further, a second image may be obtained at a second position of the camera, and a second angle between the object and a perpendicular line passing through a visual field center of the second image can be determined. A third angle by which the camera rotates from the first position to the second position can be determined. According to the first angle, the second angle, the third angle, and a rotation radius of the camera, a first distance from the first position of the camera to the object and a second distance from the second position of the camera to the object may be determined. Further, the RTG height of the UAV may be calculated according to the first distance, the second distance, and a position relationship between the camera and the UAV.

The above-described manner of calculating the RTG height of the UAV by using a monocular camera or a binocular camera is merely for illustrative purposes and is not intended to limit the present disclosure. The manner of calculating the RTG height of the UAV is not restricted in the present disclosure, and may be selected according to various application scenarios.

In Approach 3, the RTG height of the UAV is calculated according to the second time difference and the transmission speed of the radar signal wave.

In some embodiments, after the second time difference is obtained according to the emitting time of the radar wave transmitter and the receiving time of the radar wave receiver, given that the transmission speed of the radar wave signal in air is known, the RTG height of the UAV can be calculated according to the second time difference and the transmission speed of the radar wave signal.

The above-described examples of approaches of calculating the RTG height of the UAV according to the sensing data are merely for illustrative purposes, and are not intended to limit the scope of the present disclosure. In various application scenarios, other manners may be selected. For example, a first sensor may be used to obtain a moving speed of the UAV in a first coordinate system, a second sensor may be used to obtain a moving speed of the UAV in a second coordinate system. According to the moving speed of the UAV in the first coordinate system, the moving speed of the UAV in the second coordinate system, and a vertical height difference between the first sensor and the second sensor, the vertical height of the UAV relative to the object can be determined. The manners of calculating the RTG height of the UAV are not restricted in the present disclosure.

Process 203 in FIG. 2 is same as or similar to process 101 described with reference to FIG. 1, the descriptions of which are not repeated here.

At 204, if the RTG height is not greater than the first preset height threshold, and the UAV has not lowered the landing gear, the RTG height is adjusted to the first preset height threshold or above, and the landing gear is lowered.

In some embodiments, if the detected RTG height of the UAV is not greater than the first preset height threshold, and the UAV has not lowered the landing gear, the RTG height may be adjusted to the first preset height threshold or above, and the landing gear may be lowered, i.e., released.

In some embodiments, lowering the landing gear may include lowering the landing gear during a process of adjusting the RTG height to the first preset height threshold or above; or lowering the landing gear when the UAV maintains the RTG height at the first preset height threshold or above; or if the RTG height is adjusted to be above the first preset height threshold, lowering the landing gear before the adjusted RTG height drops back to the first preset height threshold.

When the RTG height of the UAV is smaller than or equal to the first preset height threshold, the landing gear can be lowered according to one of various manners, such as described below. 1, it is assumed that the first preset height threshold is approximately 0.7 m and the RTG height of the UAV suddenly changes to approximately 0.3 m. Then, if the RTG height of the UAV needs to be adjusted to approximately 0.7 m, the landing gear may be lowered as the RTG height of the UAV is gradually increased from approximately 0.3 m to approximately 0.7 m. If the RTG height of the UAV needs to be adjusted to approximately 0.9 m, the landing gear may be lowered as the RTG height of the UAV is gradually increased from approximately 0.3 m to approximately 0.9 m.

2, it is assumed that the first preset height threshold is approximately 0.7 m and the RTG height of the UAV suddenly changes to approximately 0.3 m. Then, if the RTG height of the UAV needs to be adjusted to approximately 0.7 m, after the RTG height of the UAV is gradually increased from approximately 0.3 m to approximately 0.7 m, the RTG height of the UAV may be maintained at approximately 0.7 m, and the landing gear may be lowered as the RTG height of the UAV maintains at approximately 0.7 m. If the RTG height of the UAV needs to be adjusted to approximately 0.9 m, after the RTG height of the UAV is gradually increased from approximately 0.3 m to approximately 0.9 m, the RTG height of the UAV may be maintained at approximately 0.9 m, and the landing gear may be lowered as the RTG height of the UAV maintains at approximately 0.9 m.

3, it is assumed that the preset height threshold is approximately 0.7 m and the RTG height of the UAV suddenly changes to approximately 0.3 m. Then, if the RTG height of the UAV needs to be adjusted to approximately 0.9 m, the landing gear may be lowered before the RTG height of the UAV drops from approximately 0.9 m to approximately 0.7 m.

Some features of the embodiment associated with FIG. 2 are same as or similar to corresponding features described in connection with process 102 in FIG. 1, and descriptions thereof are not repeated here.

In some embodiments, if it is detected that the RTG height of the UAV is greater than the first preset height threshold, it is indicated that the UAV is in a relatively safe flight status at this time. Correspondingly, the process may be ended without a need to perform other operations, but the RTG height of the UAV may still be monitored in real time to prevent a situation that the landing gear is not lowered when the RTG height of the UAV does not satisfy the safe height, which are not restricted in the present disclosure.

In some embodiments, the UAV may receive a descent instruction before the UAV releases the landing gear or during a release of the landing gear. In order to ensure a flight safety of the UAV, a height-limiting flight of the UAV may be performed. That is, a low-height limiting function of the UAV may be automatically turned on, which is described below.

Figure 3:
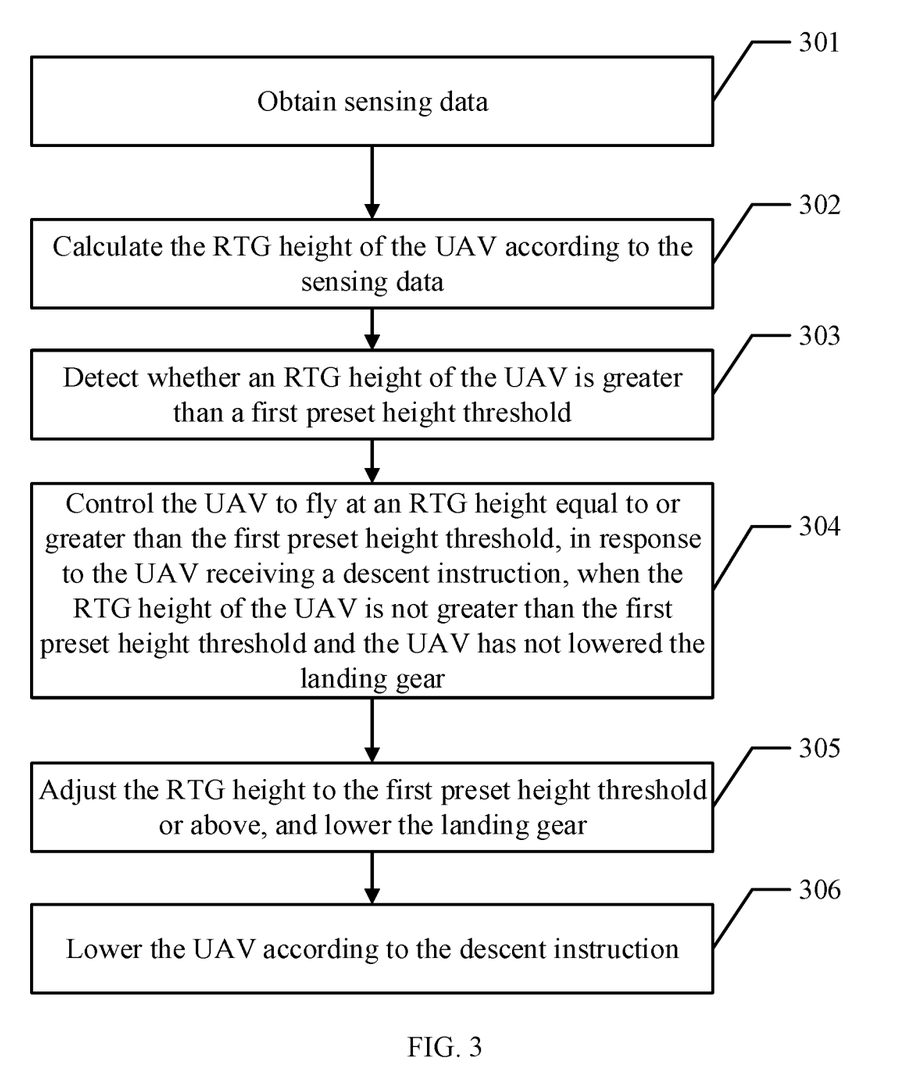
FIG. 3 illustrates a flow chart of another exemplary method for controlling a UAV landing gear according to various disclosed embodiments of the present disclosure.

FIG. 3 illustrates a flow chart of another exemplary method for controlling a UAV landing gear according to various disclosed embodiments of the present disclosure.

Processes 301 to 303 are same as or similar to processes 201 to 203 described with reference to FIG. 2, and descriptions thereof are not repeated here.

At 304, when the RTG height of the UAV is not greater than the first preset height threshold and the UAV has not lowered the landing gear, if the UAV receives a descent instruction, the UAV is controlled to fly at an RTG height equal to or greater than the first preset height threshold.

In some embodiments, when it is detected that the RTG height of the UAV is not greater than the first preset height threshold and the UAV has not released the landing gear, if the UAV receives the descent instruction, the UAV may be controlled to fly at the RTG height equal to or greater than the first preset height threshold.

In some embodiments, in order to ensure the safety of the UAV and avoid a direct collision between the UAV and the object, the UAV may be provided with the low-height limiting function. When the landing gear has not been lowered, the UAV may automatically keep flying at the RTG height equal to or greater than the first preset height threshold. In some embodiments, the UAV can be controlled by a control terminal, i.e., a UAV remote control. The UAV remote control may include a throttle rocker having three gear levels, i.e., an above-neutral level, a neutral level, and a below-neutral level. The neutral level refers to the throttle rocker being located at a middle position of an entire travel distance. The three gear levels may be used to control a motion of the UAV in a vertical direction. When the throttle rocker is at the above-neutral level, the UAV may receive an ascent instruction, and the ascent instruction may be used to instruct the UAV to move upward. When the throttle rocker is at the neutral level, the UAV may receive a flight instruction of flying at a current RTG height. When the throttle rocker is at the below-neutral level, the UAV may receive a descent instruction, and the descent instruction may be used to instruct the UAV to move downward. In some embodiments, if the UAV landing gear has not been lowered and when the UAV receives the descent instruction, because the low-height limiting function is turned on, if the RTG height of the UAV is not greater than the first preset height threshold, the UAV may not response to the descent instruction, and the UAV may automatically change the RTG height to the first preset height threshold or above for the flight. In some embodiments, in order to better respond to the descent instruction, the UAV may keep flying at the RTG height equal to the first preset height threshold.

In some embodiments, when it is detected that the RTG height of the UAV is not greater than the first preset height threshold and the UAV has not lowered the landing gear, if the position of the throttle rocker is at the above-neutral level, the UAV may receive the ascent instruction, and the UAV can move upwards in response to the ascent instruction without being affected by the low-height limiting function. If the throttle rocker is in the neutral level, the UAV may receive the flight instruction of holding the current RTG height. Correspondingly, the UAV may respond to the flight instruction when the current RTG height is equal to or greater than the first preset height threshold or above. When the current RTG height is lower than the first preset height threshold, the UAV may not response to the flight instruction, and may change to and keep flying at an RTG height equal to or greater than the first preset height threshold or above.

At 305, the RTG height is adjusted to the first preset height threshold or above, and the landing gear is lowered.

In some embodiments, after receiving the descent instruction and controlling the UAV to keep flying at the RTG height equal to or greater than the first preset height threshold, the RTG height may be further adjusted to an RTG height that is at the first preset height threshold or above, and the landing gear may be lowered.

In some embodiments, when the UAV keep flying at an RTG height equal to or greater than the first preset height threshold, the landing gear may be lowered at the RTG height that the UAV currently maintains (also referred to as "currently-maintained RTG height), or the currently-maintained RTG height may be adjusted separately. For example, suppose the first preset height threshold of the UAV is approximately 0.7 m. When the RTG height of the UAV suddenly changes to a height of approximately 0.3 m, if the UAV receives a descent instruction, the UAV may not descend in response to the descent instruction. Due to the low-height limiting function, the UAV may slowly increase the RTG height from approximately 0.3 m to approximately 0.7 m or above, and fly at the increased RTG height. The landing gear may be lowered during the process of the UAV slowly ascending from approximately 0.3 m to an RTG height of approximately 0.7 or above, or may be lowered when the UAV maintains at the RTG height of approximately 0.7 m or above, or may be lowered when the RTG height of the UAV is above approximately 0.7 m and is further adjusted, i.e., during a process of the UAV descending from the RTG height above approximately 0.7 m to approximately 0.7 m, which are not restricted in the present disclosure.

In some embodiments, processes 304 and 305 may be executed at a same time. That is, when the UAV flies at an RTG height equals to or greater than the first preset height threshold, the UAV may not respond to the descent instruction and may lower the landing gear. In some embodiments, when the UAV is in a process of lowering the landing gear, the landing gear can be considered as being at a retracted status.

At 306, the UAV descends according to the descent instruction.

In some embodiments, after the RTG height is adjusted to the first preset height threshold or above, and the landing gear is lowered, the UAV may descend according to the descent instruction.

In some embodiments, after the UAV landing gear is lowered, the UAV can be considered as being at a relatively safe status, the landing gear can protect a UAV gimbal or camera, and a direct collision between the UAV and an object can be prevented. Thus, the low-height limiting function can be automatically turned off. Correspondingly, when the throttle rocker position is still at the below-neutral level, the UAV can descend according to the descent instruction.

Further, if the throttle rocker is still at the neutral level, the UAV can keep flying at the current RTG height.

Further, after the UAV landing gear is lowered, if the throttle rocker is pushed to the above-neutral level, the UAV can move upwards. The landing gear may not be retracted although the RTG height is greater than the first preset height threshold. That is, the landing gear may stay at the released status, but the low-height limiting function may be turned off. In some other embodiments, the landing gear of the UAV may be automatically retracted when the RTG height is greater than the first preset height threshold. Whether or not the landing gear of the UAV is automatically retracted when the RTG height is greater than the first preset height threshold is not restricted in the present disclosure, and may be selected according to various application scenarios.

In some embodiments, if it is detected that the RTG height of the UAV is greater than the first preset height threshold, it is indicated that the UAV is in a relatively safe flight status at this time. Correspondingly, the process may be ended without a need to perform other operations, but the RTG height of the UAV may still be monitored in real time to prevent a situation that the landing gear is not lowered when the RTG height of the UAV does not satisfy the safe height, which are not restricted in the present disclosure.

In some embodiments, in the application scenarios described with reference to FIG. 3, a descent instruction may be received before the landing gear of the UAV is released or during the process of releasing the landing gear of the UAV. In some other embodiments, there are scenarios different from the application scenarios described with reference to FIG. 3, and a descent instruction may be received after the landing gear is released. Because the low-height limiting function of the UAV is turned off, after the UAV receives descent instruction, the UAV may directly respond to the descent instruction, as described below.

Figure 4:
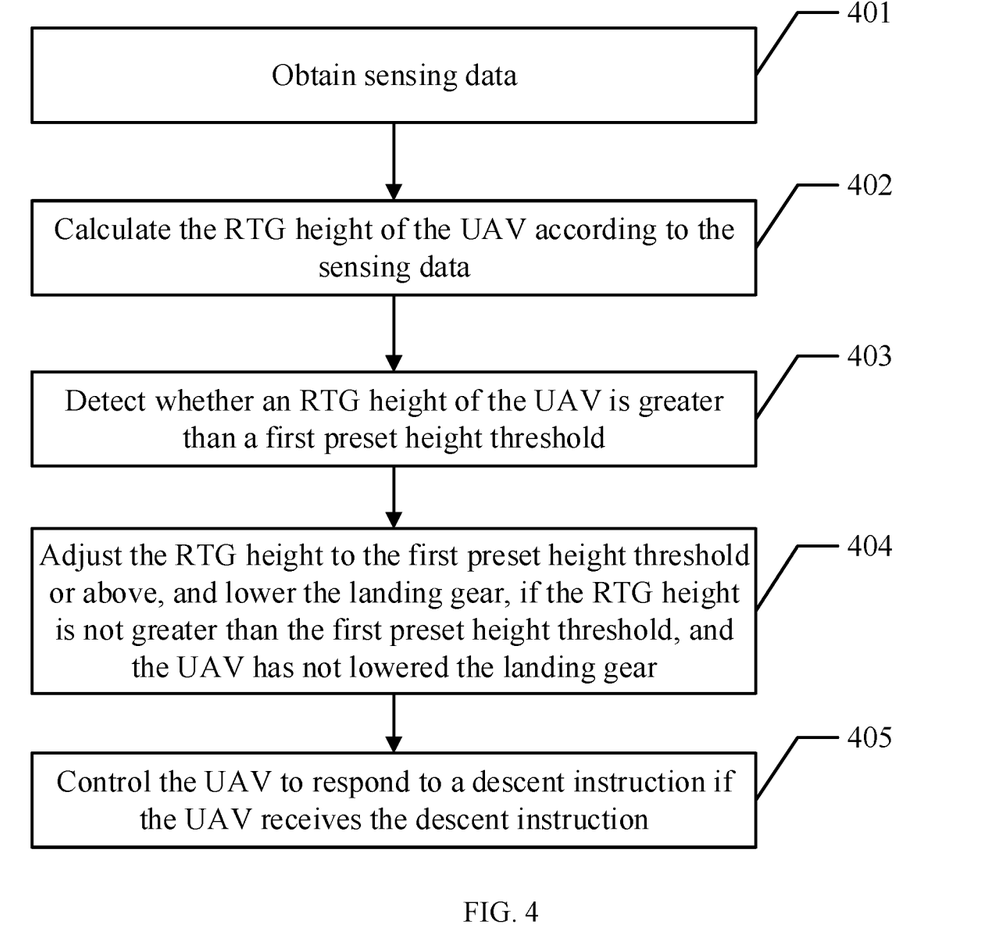
FIG. 4 illustrates a flow chart of another exemplary method for controlling a UAV landing gear according to various disclosed embodiments of the present disclosure.

FIG. 4 illustrates a flow chart of another exemplary method for controlling a UAV landing gear according to various disclosed embodiments of the present disclosure.

Processes 401 to 404 are same as or similar to processes 201 to 204 described with reference to FIG. 2, and descriptions thereof are not repeated here.

At 405, if the UAV receives a descent instruction, the UAV is controlled to respond to the descent instruction.

In some embodiments, after the RTG height is adjusted to the first preset height threshold or above and the landing gear is released, if the UAV receives the descent instruction, the UAV may be controlled to respond to the descent instruction.

In some embodiments, because the landing gear of the UAV is at the released status, and thus the low-height limiting function is turned off, when the throttle rocker position is pushed to the below-neutral level, the UAV can receive the descent instruction, and the UAV may be controlled to respond to the descent instruction, i.e., to directly descend.

In some embodiments, if it is detected that the RTG height of the UAV is larger than the first preset height threshold, it is indicated that the UAV is in a relatively safe flight status at this time. Correspondingly, the process may be ended without a need to perform other operations, but the RTG height of the UAV may still be monitored in real time to prevent a situation that the landing gear is not lowered when the RTG height of the UAV does not satisfy the safe height, which are not restricted in the present disclosure.

Further, after the UAV landing gear is released, under a relatively safe condition of the UAV, the landing gear may also be retracted according to some application scenarios, which are described below in detail.

Figure 5:
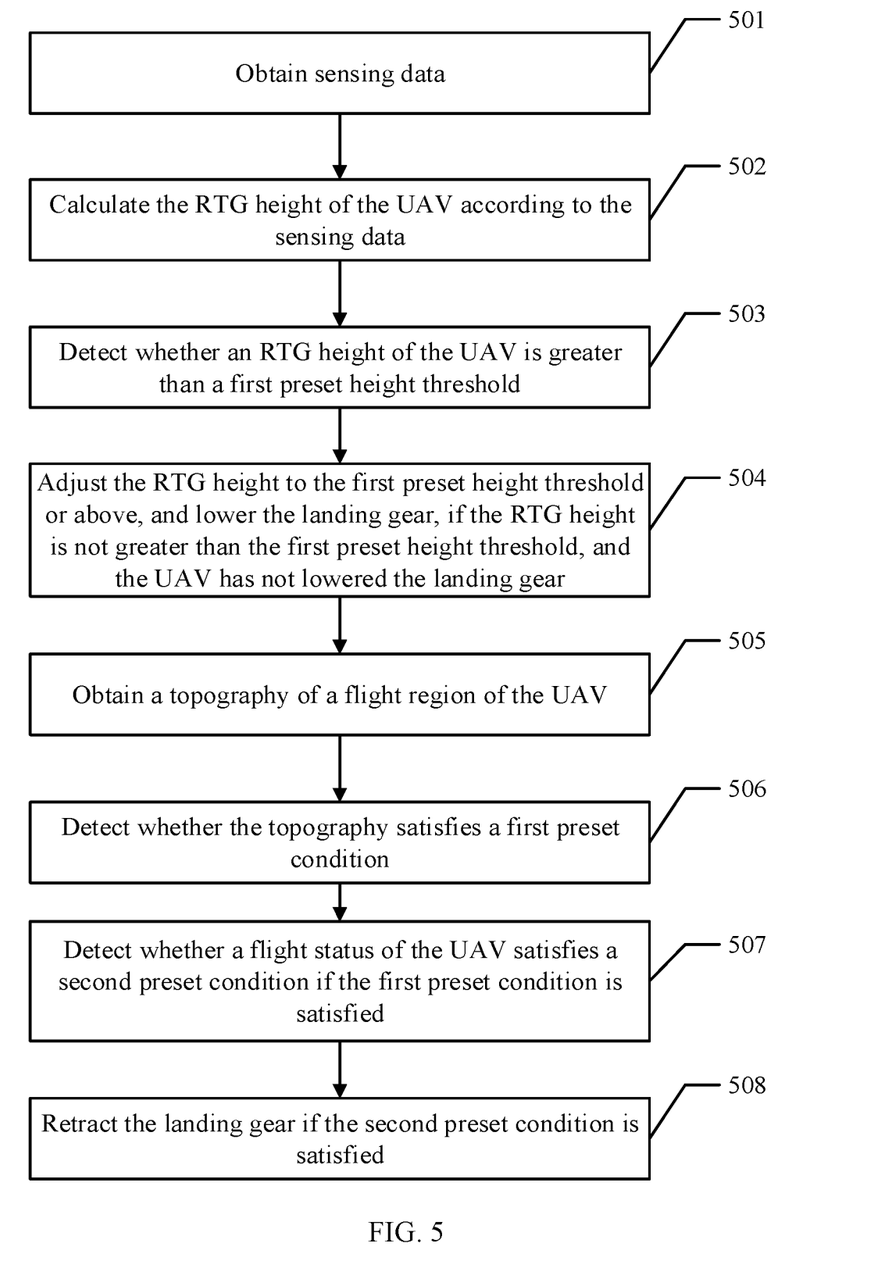
FIG. 5 illustrates a flow chart of another exemplary method for controlling a UAV landing gear according to various disclosed embodiments of the present disclosure.

FIG. 5 illustrates a flow chart of another exemplary method for controlling a UAV landing gear according to various disclosed embodiments of the present disclosure.

Processes 501 to 504 are same as or similar to processes 201 to 204 described with reference to FIG. 2, and descriptions thereof are not repeated here.

At 505, a topography of a flight region of the UAV is obtained.

In some embodiments, after the RTG height is adjusted to the first preset height threshold or above and the landing gear is released, the topography of the flight region of the UAV may be obtained in real time. In some embodiments, the flight region may be determined according to a speed of the UAV, and an area of the flight region may be positively correlated with the speed of the UAV.

In some embodiments, after the UAV has released the landing gear, if there is no possibility of a direct collision between the UAV and an object, the UAV landing gear may be retracted according to the actual situation, such that a resistance on the UAV may be reduced, a UAV endurance may be improved, and a flight speed of the UAV may be improved. Thus, the topography of the flight region of the UAV may be obtained for detecting whether the topography satisfies a requirement for the UAV to retract the landing gear.

In some embodiments, to obtain a relatively accurate determination of whether the UAV needs to retract the landing gear, the flight region of the UAV may be determined according to the UAV speed. The greater the UAV speed is, the larger is the determined flight region of the UAV. The flight region may include a square centered at the location of the UAV, or may include a circle centered at the location of the UAV, or may be determined in conjunction with a flight direction of the UAV, which is not restricted in the present disclosure.

When obtaining the topography of the flight region, the flight height of the UAV may usually be relatively high. Correspondingly, a radar wave sensor, a real-time kinematic (RTK) sensor, a pressure gauge, or anther sensor for a long distance measurement may be used to calculate an RTG height.

In some embodiments, the UAV may be provided with a global positioning system (GPS) or a global navigation satellite system (GNSS), and position information of the UAV may be determined through the GPS or GNSS. The position information may be used to obtain the topography of the UAV position from a server.

Further, the position information may include, but not limited to, a latitude, a longitude and/or an altitude of the UAV.

In some embodiments, besides obtaining the topography of the flight region according to GPS or GNSS, the topography of the flight region may be obtained through other methods. For example, a camera may be used to capture images or videos, and the images or the videos may be analyzed to obtain the topography of the flight region of the UAV. The manners of obtaining the topography of the flight region of the UAV are not restricted in the present disclosure.

At 506, it is detected whether the topography satisfies a first preset condition.

In some embodiments, after the topography of the flight region of the UAV is obtained, it may be detected whether the topography satisfies the first preset condition.

In some embodiments, detecting whether the topography satisfies the first preset condition may include determining that the topography satisfies the first preset condition, if there are no contour lines in the topography that are denser than a preset density and exceed a preset altitude threshold; or determining that the topography satisfies the first preset condition, if, when the UAV flies at a fixed altitude, a variation of the RTG height obtained based on the topography is within a preset range.

In some embodiments, the detection of the topography of the flight region of the UAV may help to prevent the UAV landing gear from being frequently released or retracted when the terrain abruptly changes. In some embodiments, contour lines of the flight region can be determined by corresponding analysis of the obtained topography. The contour lines can be used to represent altitude characteristics of the flight region. If there are no contour lines in the obtained topography that are denser than the preset density and exceed the preset altitude threshold, it is indicated that an abrupt terrain change may not exit in the topography of the flight region, and it is determined that the topography may satisfy the first preset condition. In some embodiments, when the UAV flies at a fixed altitude, e.g., flying at a height of approximately 1,000 m, the variation of RTG height of the UAV may be obtained according to the obtained topography. If the variation of RTG height is within the preset range, it is indicated that an abrupt terrain change may not exit in the topography of the flight region, and it is determined that the topography may satisfy the first preset condition.

For example, the RTG height of the UAV may be obtained based on the topography in a first period. It is assumed that two RTG heights of the UAV obtained subsequently are approximately 900 m and approximately 895 m respectively. Thus, it can be determined whether a variation between the two RTG heights, i.e., approximately 5 m, is within a preset range of approximately 0 to approximately 10 m. If the variation is within the preset range, it may be determined that the terrain change of the flight region is not abrupt, and the topography satisfies the first present condition.

In some embodiments, the preset density, the preset altitude threshold, and the preset range may be set in advance, and can be set according to data statistics, or can be set based on operation experience of the UAV, which are not restricted in the preset disclosure.

The above-described examples are merely for illustrating manners of detecting whether the topography satisfies the first preset condition, and are not intended to limit the scope of the present disclosure. In various application scenarios, other manners may be selected to determine whether the topography satisfies the first preset condition, which are not restricted in the present disclosure.

At 507, if the first preset condition is satisfied, it is detected whether a flight status of the UAV satisfies a second preset condition.

In some embodiments, in response to detecting that the topography of the flight region of the UAV satisfies the first preset condition, it may be detected whether the flight status of the UAV satisfies the second preset condition.

In some embodiments, detecting whether the flight status of the UAV satisfies the second preset condition may include determining that the flight status of the UAV satisfies the second preset condition if the UAV does not receive the descent instruction and the RTG height is greater than a second preset height threshold.

In some embodiments, the second preset height threshold may be set in advance, which may be equal to the first preset height threshold, or may be larger than the first preset height threshold, to ensure the safety of the UAV. In some embodiments, after the topography of the UAV satisfies the first preset condition, if the throttle rocker position is at the neutral level or the above-neutral level, it may be indicated that the UAV does not receive the descent instruction. Further, the RTG height of the UAV may be obtained. When the RTG height of the UAV is larger than the second preset height threshold, it may be determined that the UAV does not need to release the landing gear in the current flight status, and further it may be determined that the flight status of the UAV satisfies the second preset condition.

In some embodiments, the second preset height threshold may be set, for example, based on data statistics, or based on operational experience of a UAV user, which is not restricted in the present disclosure.

At 508, if the second preset condition is satisfied, the landing gear is retracted.

In some embodiments, if it is detected that the flight status of the UAV satisfies the second preset condition, the landing gear may be retracted.

In some embodiments, if the topography of the UAV satisfies the first preset condition and the flight status of the UAV satisfies the second preset condition, it may be predicted that no abrupt terrain change may exist in the flight region of the UAV. At the same time, if the UAV does not need to descend, a rick of a direct contact between the UAV and an object may be suppressed, and the UAV landing gear may be retracted to reduce the flight resistance on the UAV.

In some embodiments, if it is detected that the RTG height of the UAV is greater than the first preset height threshold, it is indicated that the UAV is in a relatively safe flight status at this time. Correspondingly, the process may be ended without a need to perform other operations, but the RTG height of the UAV may still be monitored in real time to prevent a situation that the landing gear is not lowered when the RTG height of the UAV does not satisfy the safe height, which are not restricted in the present disclosure.

In some embodiments, if it is detected that the topography of the flight region of the UAV does not satisfy the first preset condition, the RTG height of the UAV may be considered as being in a condition that may become an unsafe height at any time. Correspondingly, other operations may not be performed, such that the landing gear of the UAV may be kept at a lowered status, but the topography of the fight region of the UAV may still be detected, which is not restricted in the present disclosure.

Further, if it is detected that the flight status of the UAV does not satisfy the second preset condition, it may be considered that the UAV may be in a descent process or the RTG height of the UAV may not be a safe height. Correspondingly, other operations may not be performed, such that the landing gear of the UAV may be kept at the lowered status, but the flight status of the UAV may still be detected, which is not restricted in the present disclosure.

Figure 6:
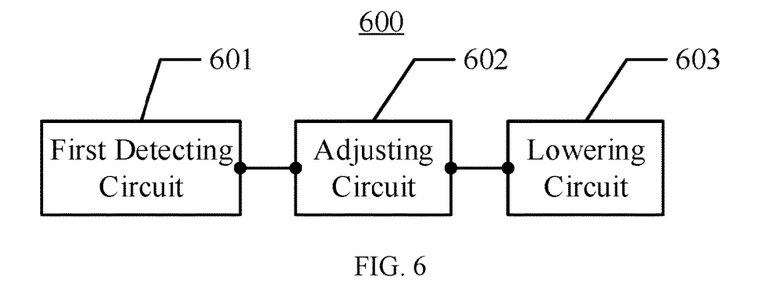
FIG. 6 illustrates a block diagram of an exemplary control apparatus for controlling a UAV landing gear according to various disclosed embodiments of the present disclosure.

The methods for controlling the UAV landing gear in the embodiments of the present disclosure are described above. The present disclosure also provides a UAV landing gear control apparatus, which is described below. FIG. 6 illustrates a block diagram of an exemplary control apparatus 600 for controlling a UAV landing gear according to various disclosed embodiments of the present disclosure. As shown in FIG. 6, the control apparatus 600 includes a first detecting circuit 601, an adjusting circuit 602, and a lowering circuit 603.

The first detecting circuit 601 is configured to detect whether an RTG height of the UAV is greater than a first preset height threshold. The RTG height is a vertical height of the UAV with respect to an object.

The adjusting circuit 602 is configured to adjust the RTG height of the UAV to the first preset height threshold or above, when the RTG height is not greater than the first preset height threshold and the UAV has not lowered the landing gear.

The lowering circuit 603 is configured to lower the landing gear.

Figure 7:
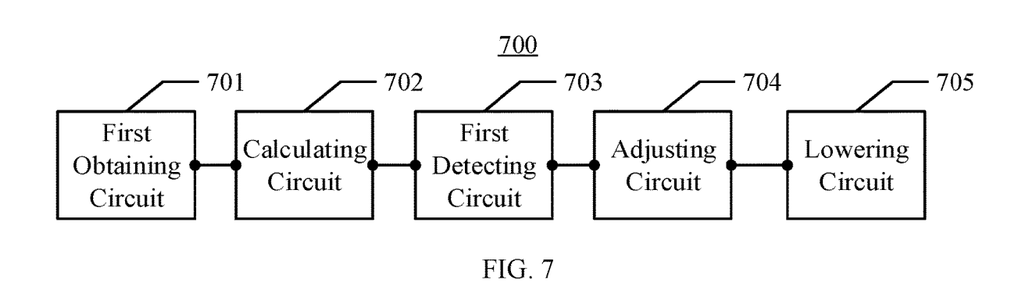
FIG. 7 illustrates a block diagram of another exemplary control apparatus for controlling a UAV landing gear according to various disclosed embodiments of the present disclosure.

FIG. 7 illustrates a block diagram of another exemplary control apparatus 700 for controlling a UAV landing gear according to various disclosed embodiments of the present disclosure. As shown in FIG. 7, the control apparatus 700 includes a first obtaining circuit 701, a calculating circuit 702, a first detecting circuit 703, an adjusting circuit 704, and a lowering circuit 705.

The first obtaining circuit 701 is configured to obtain sensing data.

The calculating circuit 702 is configured to calculate an RTG height of the UAV according to the sensing data.

The first detecting circuit 703 in FIG. 7 is same as or similar to the first detecting circuit 601 in FIG. 6, the adjusting circuit 704 in FIG. 7 is same as or similar to the adjusting circuit 602 in FIG. 6, and the lowering circuit 705 in FIG. 7 is same as or similar to the lowering circuit 603 in FIG. 6, and descriptions thereof are not repeated here.

In some embodiments, the first obtaining module 701 may be further configured to obtain a first time difference between the UAV emitting an ultrasonic wave signal and receiving a reflected signal of the ultrasonic wave signal. The calculating circuit 702 may be further configured to calculate the RTG height of the UAV according to the first time difference and a transmission speed of the ultrasonic wave signal.

In some embodiments, the first obtaining circuit 701 may be further configured to obtain an image distance of a camera of the UAV when the camera of the UAV focuses on the object. The calculating circuit 702 may be further configured to calculate the RTG height of the UAV according to a correspondence between the image distance and an object distance.

In some embodiments, the first obtaining circuit 701 may be further configured to obtain a second time difference between the UAV emitting a radar wave signal and receiving a reflected signal of the radar wave signal. The calculating circuit 702 may be further configured to calculate the RTG height of the UAV according to the second time difference and a transmission speed of the radar wave signal.

In some embodiments, the lowering circuit 705 may be further configured to lower the landing gear during a process of adjusting the RTG height to the first preset height threshold or above; or lower the landing gear when the UAV maintains an RTG height equal to or greater than the first preset height threshold; or if the RTG height is adjusted to be above the first preset height threshold, lower the landing gear before the adjusted RTG height drops back to the first preset height threshold.

Figure 8:
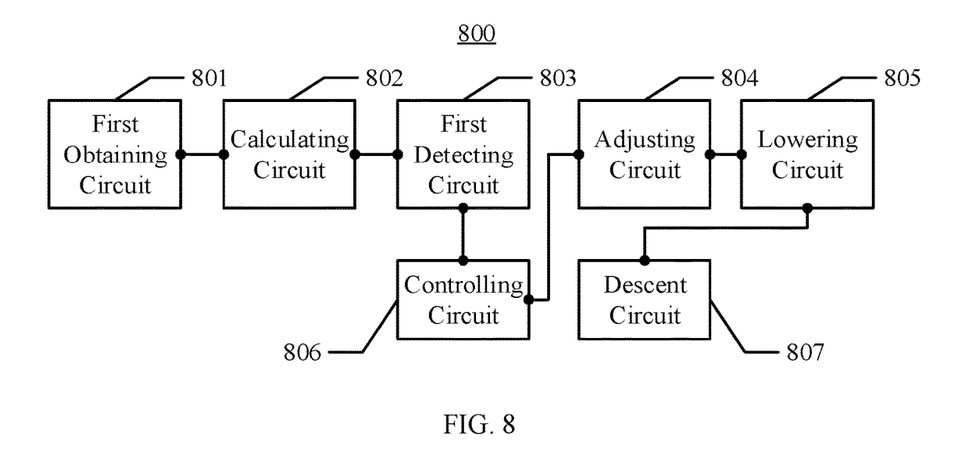
FIG. 8 illustrates a block diagram of another exemplary control apparatus for controlling a UAV landing gear according to various disclosed embodiments of the present disclosure.

FIG. 8 illustrates a block diagram of another exemplary control apparatus 800 for controlling a UAV landing gear according to various disclosed embodiments of the present disclosure. As shown in FIG. 8, the control apparatus 800 includes a first obtaining circuit 801, a calculating circuit 802, a first detecting circuit 803, an adjusting circuit 804, a lowering circuit 805, a controlling circuit 806, and a descent circuit 807.

The first obtaining circuit 801, the calculating circuit 802, the first detecting circuit 803, the adjusting circuit 804, and the lowering circuit 805 in FIG. 8 are same as or similar to the first obtaining circuit 701, the calculating circuit 702, the first detecting circuit 703, the adjusting circuit 704, and the lowering circuit 705 in FIG. 7, respectively, and descriptions thereof are not repeated here.

The controlling circuit 806 is configured to, before the lowering circuit 805 performs a corresponding action, control the UAV to fly at an RTG height equal to or greater than the first preset height threshold when the UAV receives a descent instruction.

The descent circuit 807 is configured to lower the UAV according to the descent instruction.

In some embodiments, the controlling circuit 806 may be further configured to, after the lowering circuit 805 performs the corresponding action, control the UAV to respond to the descent instruction when the UAV receives the descent instruction.

Figure 9:
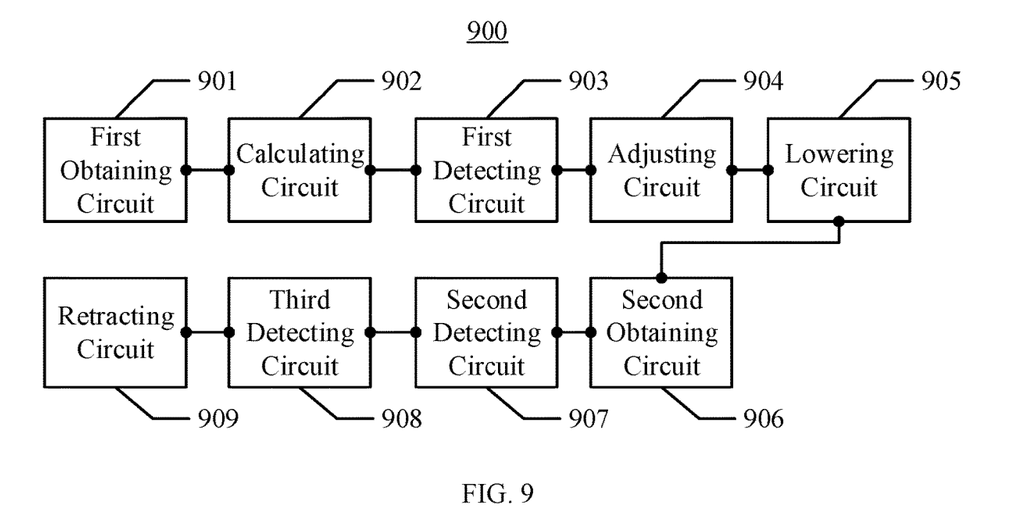
FIG. 9 illustrates a block diagram of another exemplary control apparatus for controlling a UAV landing gear according to various disclosed embodiments of the present disclosure.

FIG. 9 illustrates a block diagram of another exemplary control apparatus 900 for controlling a UAV landing gear according to various disclosed embodiments of the present disclosure. As shown in FIG. 9, the control apparatus 900 a first obtaining circuit 901, a calculating circuit 902, a first detecting circuit 803, an adjusting circuit 904, a lowering circuit 905, a second obtaining circuit 906, a second detecting circuit 907, a third detecting circuit 908, and a retracting circuit 909.

The first obtaining circuit 901, the calculating circuit 902, the first detecting circuit 903, the adjusting circuit 904, and the lowering circuit 905 in FIG. 9 are same as or similar to the first obtaining circuit 701, the calculating circuit 702, the first detecting circuit 703, the adjusting circuit 704, and the lowering circuit 705 in FIG. 7, respectively, and descriptions thereof are not repeated here.

The second obtaining circuit 906 may be configured to obtain a topography of a flight region of the UAV. The flight region may be determined according to a speed of the UAV. An area of the flight region may be positively correlated to the speed.

The second detecting circuit 907 is configured to detect whether the topography satisfies a first preset condition.

The third detecting circuit 908 may be configured to detect whether a flight status of the UAV satisfies a second preset condition when the topography satisfies the first preset condition.

The retracting module 909 may be configured to retract the landing gear when the flight status of the UAV satisfies the second preset condition.

In some embodiments, the second detecting circuit 907 may be further configured to determine that the topography satisfies the first preset condition, if there are no contour lines in the topography that are denser than a preset density and exceed a preset altitude threshold; or determine that the topography satisfies the first preset condition if, when the UAV flies at a fixed altitude, a variation of the RTG height obtained based on the topography is within a preset range.

In some embodiments, the third detecting module 908 may be further configured to determine that the flight state of the UAV satisfies the second preset condition if the UAV does not receive a descent instruction and the RTG height is greater than a second preset height threshold.

Figure 10:
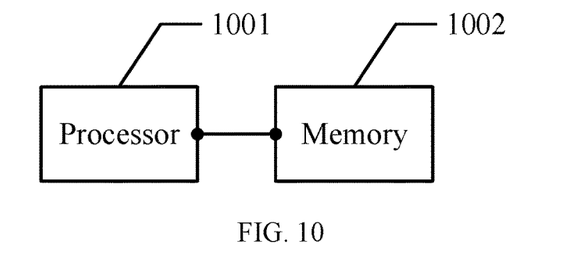
FIG. 10 illustrates a block diagram of an exemplary user device according to various disclosed embodiments of the present disclosure.

The UAV landing gear control apparatuses of the present disclosure are described above from the perspective of functional entities. The user devices of the present disclosure are described below from the perspective of hardware. FIG. 10 illustrates a block diagram of an exemplary user device according to various disclosed embodiments of the present disclosure.

As shown in FIG. 10, the user device includes a processor 1001 and a memory 1002.

The memory 1002 is configured to store instructions. The processor 1001 is configured to execute the stored instructions. The stored instructions, when executed by the processor 1001, cause the user device to perform a method consistent with the disclosure, such as one of the example methods described above. In some embodiments, when executed by the processor 1001, the stored instructions cause the user device to detect whether an RTG height of the UAV is greater than a first preset height threshold, where the RTG height is a vertical height of the UAV with respect to an object; and, if the RTG height is not greater than the first preset height threshold and the UAV has not lowered the landing gear, adjust the RTG height to the first preset height threshold or above, and lower the landing gear.

In some embodiments, the stored instructions, when executed by the processor 1001, further cause the user device to obtain sensing data and calculate the RTG height of the UAV according to the sensing data.

In some embodiments, the stored instructions, when executed by the processor 1001, further cause the user device to obtain a first time difference between the UAV emitting an ultrasonic wave signal and receiving a reflected signal of the ultrasonic wave signal. Calculating the RTG height of the UAV according to the sensing data may include calculating the RTG height of the UAV according to the first time difference and a transmission speed of the ultrasonic wave signal.

In some embodiments, the stored instructions, when executed by the processor 1001, further cause the user device to obtain an image distance of a camera of the UAV when the camera of the UAV focuses on the object. Calculating the RTG height of the UAV according to the sensing data may include calculating the RTG height of the UAV according to a correspondence between the image distance and an object distance.

In some embodiments, the stored instructions, when executed by the processor 1001, further cause the user device to obtain a second time difference between the UAV emitting a radar wave signal and receiving a reflected signal of the radar wave signal. Calculating the RTG height of the UAV according to the sensing data may include calculating the RTG height of the UAV according to the second time difference and a transmission speed of the radar wave signal.

In some embodiments, the stored instructions, when executed by the processor 1001, further cause the user device to lower the landing gear during a process of adjusting the RTG height of the UAV to the first preset height threshold or above; or lower the landing gear when the UAV maintains an RTG height equal to or greater than the first preset height threshold or above, or if the RTG height is adjusted to be above the first preset height threshold, lower the landing gear before the adjusted RTG height drops back to the first preset height threshold.

In some embodiments, the stored instructions, when executed by the processor 1001, further cause the user device to, if the UAV receives a descent instruction, control the UAV to keep flying at an RTG height equal to or greater than the first preset height threshold.

In some embodiments, the stored instructions, when executed by the processor 1001, further cause the user device to lower the UAV according to a descent instruction.

In some embodiments, the stored instructions, when executed by the processor 1001, further cause the user device to, if the UAV receives the descent instruction, control the UAV to respond to the descent instruction.

In some embodiments, the stored instructions, when executed by the processor 1001, further cause the user device to obtain a topography of a flight region of the UAV, where the flight region is determined according to a speed of the UAV, and an area of the flight region is positively correlated to the speed; detect whether the topography satisfies a first preset condition; if the first preset condition is satisfied, detect whether a flight status of the UAV satisfies a second preset condition; and if the second preset condition is satisfied, retract the landing gear.

In some embodiments, the stored instructions, when executed by the processor 1001, further cause the user device to determine that the topography satisfies the first preset condition, if there are no contour lines in the topography that are denser than a preset density and exceed a preset altitude threshold; or determine that the topography satisfies the first preset condition if, when the UAV flies at a fixed altitude, a variation of RTG height obtained based on the topography is within a preset range.

In some embodiments, the stored instructions, when executed by the processor 1001, further cause the user device to determine that a flight status of the UAV satisfies the second preset condition, if the UAV does not receive a descent instruction and the RTG height is greater than the second preset height threshold.

The user device may be a UAV, which may include a fuselage, a landing gear connected to the fuselage, a controller provided at the fuselage, and a sensing element. The sensing element may be configured to sense an RTG height of the UAV. The controller may be configured to perform one or more processes consistent with the disclosure, such as the above-described processes performed by the processor 1001. The controller may include a flight controller.

The present disclosure further provides a UAV system. The UAV system may include a control terminal and a UAV that can communicate with the control terminal, such as the above-described UAV. The control terminal may be configured to send control instructions to the UAV. The UAV may include a controller, a fuselage, a sensing element, and a landing gear. The controller may control the landing gear according to received control instructions. The control terminal may include a remote control of the UAV, a tablet computer with a control system, a mobile phone, a control wristband, or the like.

The present disclosure provides a UAV landing gear control method, a UAV landing gear control apparatus, a user device, a UAV, and a UAV system. The control method may include detecting whether an RTG height of the UAV is greater than a first preset height threshold, where the RTG height may be a vertical height of the UAV with respect to an object; if the RTG height is not greater than the first preset height threshold, and the UAV has not lowered the landing gear, adjusting the RTG height to the first preset height threshold or above, and lowering the landing gear. In the method of the disclosure, the UAV can automatically lower the landing gear when there is a risk of collision between the UAV and the ground. Thus, a damage to the UAV, such as a UAV crash, due to a hard landing and touchdown of the UAV, may be suppressed, a safety performance of the UAV during a process of flying or landing may be improved, and a protection of the UAV fuselage against damages may be improved.

Those of ordinary skill in the art will appreciate that the exemplary elements and processes described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method for controlling a landing gear of an unmanned aerial vehicle (UAV), comprising:
   determining whether the landing gear of the UAV has been released or not;
   detecting a relative height of the UAV, the relative height being a vertical height of the UAV with respect to an object surface below the UAV;
   obtaining a topography of a flight region of the UAV;
   (1) keeping the landing gear of the UAV retracted in response to the relative height being greater than a height threshold and at least one of:
      the topography not including contour lines that are denser than a preset density above an altitude threshold; or
      a variation of the relative height obtained based on the topography being within a preset range when the UAV flies at a fixed altitude; and
   (2) keeping the landing gear of the UAV released in response to at least one of:
      the relative height being not greater than the height threshold;
      the topography including contour lines that are denser than the preset density above the altitude threshold; or
      the variation of the relative height obtained based on the topography being not within the preset range when the UAV flies at the fixed altitude.

2. The method according to claim 1, wherein detecting the relative height of the UAV includes:
   obtaining sensing data through one or more sensing elements at the UAV; and
   calculating the relative height of the UAV according to the sensing data.

3. The method according to claim 2, wherein:
   obtaining the sensing data includes obtaining a time difference between a time at which the UAV emits a signal and a time at which the UAV receives a reflected signal of the emitted signal, the emitted signal including a wave signal or a light pulse signal; and
   calculating the relative height of the UAV according to the sensing data includes calculating the relative height of the UAV according to the time difference and a transmission speed of the signal.

4. The method according to claim 2, wherein:
   obtaining the sensing data includes obtaining an image distance of a camera of the UAV focusing on the object, and
   calculating the relative height of the UAV according to the sensing data includes calculating the relative height of the UAV according to a correspondence between the image distance and an object distance.

5. The method according to claim 4, wherein the camera of the UAV camera includes a monocular camera or a binocular camera.

6. The method according to claim 1, further comprising:
   in response to the UAV receiving a descent instruction, the landing gear of the UAV having not been released, and the relative height of the UAV being less than the height threshold, releasing the landing gear after the UAV is controlled to move upward to cause the relative height to be equal to or greater than the height threshold, and controlling the UAV to move downward according to the descent instruction after the UAV has released the landing gear.

7. The method according to claim 1, wherein the height threshold is a first height threshold; the method further comprising:
in response to the UAV not receiving a descent instruction and the relative height being greater than a second height threshold, keeping the landing gear retracted.

8. A user device comprising:
a processor; and
a memory storing instructions that, when executed by the processor, cause the user device to:
determine whether a landing gear of an unmanned aerial vehicle (UAV) has been released or not;
detect a relative height of the UAV, the relative height being a vertical height of the UAV with respect to an object surface below the UAV;
obtain a topography of a flight region of the UAV;
(1) keep the landing gear of the UAV retracted in response to the relative height being greater than a height threshold and at least one of:
the topography not including contour lines that are denser than a preset density above an altitude threshold; or
a variation of the relative height obtained based on the topography being within a preset range when the UAV flies at a fixed altitude; and
(2) keep the landing gear of the UAV released in response to at least one of:
the relative height being not greater than the height threshold;
the topography including contour lines that are denser than the preset density above the altitude threshold; or
the variation of the relative height obtained based on the topography being not within the preset range when the UAV flies at the fixed altitude.

9. The user device according to claim 8, wherein the instructions further cause the user device to:
obtain sensing data through one or more sensing elements at the UAV; and
calculate the relative height of the UAV according to the sensing data.

10. The user device according to claim 9, wherein the instructions further cause the user device to:
obtain a time difference between a time at which the UAV emits a signal and a time at which the UAV receives a reflected signal of the emitted signal, the emitted signal including a wave signal or a light pulse signal; and
calculate the relative height of the UAV according to the time difference and a transmission speed of the signal.

11. The user device according to claim 9, wherein the instructions further cause the user device to:
obtain an image distance of a camera of the UAV focusing on the object; and
calculate the relative height of the UAV according to a correspondence between the image distance and an object distance.

12. An unmanned aerial vehicle (UAV) comprising:
a fuselage;
a landing gear connected to the fuselage;
a sensing element arranged at the fuselage and configured to sense a relative height of the UAV; and
a controller arranged at the fuselage and configured to:
determine whether the landing gear of the UAV has been released or not;
detect the relative height of the UAV, the relative height being a vertical height of the UAV with respect to an object surface below the UAV;
obtain a topography of a flight region of the UAV;
(1) keep the landing gear of the UAV retracted in response to the relative height being greater than a height threshold and at least one of:
the topography not including contour lines that are denser than a preset density above an altitude threshold; or
a variation of the relative height obtained based on the topography being within a preset range when the UAV flies at a fixed altitude; and
(2) keep the landing gear of the UAV released in response to at least one of:
the relative height being not greater than the height threshold;
the topography including contour lines that are denser than the preset density above the altitude threshold; or
the variation of the relative height obtained based on the topography being not within the preset range when the UAV flies at the fixed altitude.

13. The UAV according to claim 12, wherein:
the controller is further configured to control the landing gear according to a control instruction; and
a control terminal of a UAV system having the UAV is configured to communicate with the UAV and transmit the control instruction to the UAV.

14. The method according to claim 6, wherein releasing the landing gear includes:
releasing the landing gear during a process of adjusting the relative height to the height threshold or above; or
releasing the landing gear when the relative height is maintained at the height threshold or above; or
after the relative height is adjusted to be above the height threshold, releasing the landing gear before the relative height drops back to the height threshold.

15. The user device according to claim 8, wherein the instructions further cause the user device to:
in response to the UAV receiving a descent instruction, the landing gear of the UAV having not been released, and the relative height of the UAV being less than the height threshold, release the landing gear after the UAV is controlled to move upward to cause the relative height to be equal to or greater than the height threshold, and control the UAV to move downward according to the descent instruction after the UAV has released the landing gear.

16. The UAV according to claim 12, wherein the controller is further configured to:
in response to the UAV receiving a descent instruction, the landing gear of the UAV having not been released, and the relative height of the UAV being less than the height threshold, release the landing gear after the UAV is controlled to move upward to cause the relative height to be equal to or greater than the height threshold, and control the UAV to move downward according to the descent instruction after the UAV has released the landing gear.

* * * * *